July 20, 1943.  K. F. DOUGLAS  2,325,007

ENGINE STARTER

Filed Sept. 19, 1941

INVENTOR.
Kenneth F. Douglas

Patented July 20, 1943

2,325,007

UNITED STATES PATENT OFFICE 2,325,007

ENGINE STARTER

Kenneth F. Douglas, Elmira, N. Y., assignor to Bendix Aviation Corporation, South Bend, Ind., a corporation of Delaware Application September 19, 1941, Serial No. 411,500

2 Claims. (Cl. 74—7)

The present invention relates to engine starters and more particularly to the means for preventing rebounding of a drive pinion when it is thrown out of mesh with an engine gear as the engine starts.

In the patents to Bendix No. 1,372,264 and McGrath No. 1,401,174, starter drives of the automatically engaging and disengaging type are illustrated in which rebounding of the pinion is prevented by permitting the pinion to run off the end of the thread of its screw shaft when in idle position. This principle has been widely used in many forms of commercial starter drives as illustrated, for instance, in the patents to McGrath No. 2,017,566 and Whitney No. 1,952,645.

In such commercial applications it is customary to employ a spring for assuring re-entry of the nut member into the threads of the screw shaft upon actuation of the drive. In certain cases there has been some difficulty in designing a spring which will efficiently perform its re-entry function, but which will not cause the pinion, when idle, to be held in too close proximity to the engine gear if the threads of the nut happen to align with the thread spaces of the screw shaft. This condition calls for a short spring with rather close control of its free length, whereas the reliable performance of the re-entry function entails considerable pressure to be maintained over an appreciable distance.

It is an object of the present invention to provide a novel starter drive having an improved arrangement for preventing rebounding, assuring traversal and maintaining demeshed clearance of the pinion.

It is another object to provide such a device incorporating a pre-loaded re-entry spring for the pinion.

It is a further object to provide such a device in which the expansion of the re-entry spring is positively limited so as to accurately maintain a minimum demeshed clearance between the pinion and engine gear.

It is another object to provide such a device in which yielding anti-drift means are used to resist traversal of the pinion toward the engine gear when the starter mechanism is idle, and the re-entry spring is so limited as to its action that it does not interfere with the function of the anti-drift means.

Further objects and advantages will be apparent from the following description taken in connection with the accompanying drawing in which.

Figure 1:
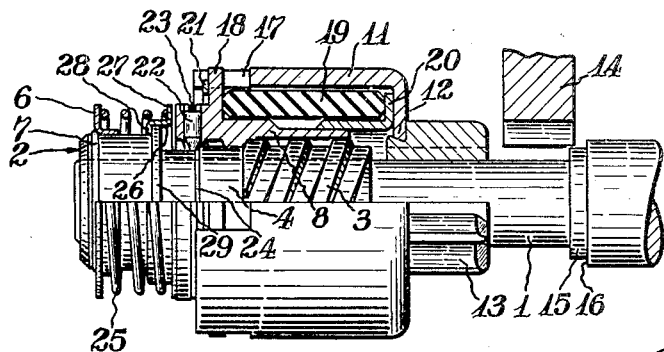
Fig. 1 is a side elevation partly broken away and in section showing a preferred embodiment of the invention with the parts in idle position.

In Fig. 1 of the drawing there is illustrated a power shaft 1 which may be the extended armature shaft of a starting motor not shown. A hollow shaft 2 having a threaded portion 3 and a smooth portion 4, is fixed to the power shaft as by means of a cross pin 5 (Fig. 2), the pin being retained in position by a flanged thimble 6 which abuts against a split lock ring 7 seated on the end of the hollow shaft.

A nut member 8 is mounted on the hollow shaft 2, normally bearing on the smooth portion 4 thereof when the parts are in idle position. A barrel member 11 is fixed in any suitable way as indicated at 12 to a pinion 13 slidably journalled on the power shaft 1 for movement into engagement with an engine gear 14, the meshing position of the pinion being defined by a thrust ring 15 seated against a shoulder 16 on the power shaft.

Barrel 11 is provided with axial slots 17 adapted to slidably receive lugs 18 extending radially from the nut 8. A cylinder 19 of elastically deformable material such as rubber is mounted in the barrel 11 seated at one end on the nut 8 and at the other end on a thimble 20. The cylinder is maintained under slight initial compression between the nut and thimble by means of a lock ring 21 confining the nut within the barrel.

Means for yieldingly resisting longitudinal movement of the nut 8 and its associated parts away from idle position is provided in the form of a detent 22 slidably mounted in the nut and pressed by a spring ring 23 against a shoulder 24 formed on the hollow shaft 2.

Means for assuring entry of the nut 8 on the thread of the hollow shaft upon rotation of the power shaft is provided in the form of a compression spring 25 mounted on the hollow shaft bearing against the thimble 6 thereon and arranged to apply pressure to the nut 8 to cause it to enter said thread. According to the present invention means are provided for limiting the expansion of the spring 25 so as to prevent it from interfering with the action of the anti-drift detent 22. As here shown, this means is in the form of a thimble 26 slidably mounted on the hollow shaft 2, forming a seat for the spring 25 and having a radial flange 27 interposed between the spring 25 and the nut 8. Thimble 26 has an inwardly extending flange 28 which is adapted to engage a shoulder 29 on the hollow shaft 2 which limits its longitudinal movement to the position illustrated in Fig. 1 where the nut 8 has just started to enter the thread of the shaft 2, and the anti-drift detent 22 is about to engage the shoulder 24 to resist further longitudinal movement of the pinion-nut assembly.

In operation, starting with the parts in position as illustrated in Fig. 1, rotation of the power shaft 1 causes the nut 8 to be traversed to the right by the thread 3 of the hollow shaft to bring the pinion 13 into mesh with the engine gear 14 and into abutting relation with the thrust collar 15. Further movement of the nut is cushioned by compression of the rubber cylinder 19 whereby rotation is yieldingly transmitted to the engine gear.

Figure 2:
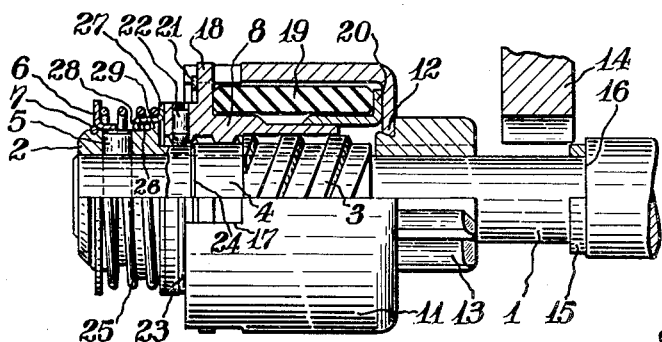
Fig. 2 is a similar view showing the parts in the positions assumed while the pinion and its associated parts are overrunning the power shaft.

When the engine starts, the pinion, nut and barrel are accelerated by the engine gear and the nut is accordingly threaded back onto the smooth portion 4 of the hollow shaft after which the nut and its associated parts rotate idly until their momentum is dissipated as indicated in Fig. 2. Thereafter the expansion of the spring 25 presses the nut 8 against the end of the thread 3 so as to assure entry of the nut on said thread upon re-actuation of the drive.

If the threads of the hollow shaft and nut are suitably positioned when the nut stops overrunning, the spring 25 will move the nut into initial engagement with the thread of the hollow shaft as illustrated in Fig. 1, but since the expansion of the spring 25 is limited by the thimble 26, the spring has no tendency to overcome the effect of the anti-drift 22, and the demeshed clearance between the pinion 13 and the engine gear 14 is therefore properly maintained.

Although but one embodiment of the invention has been shown and described in detail, it will be understood that other embodiments are possible and that changes may be made in the design and arrangement of the parts without departing from the spirit of the invention as described in the claims appended hereto.

What is claimed is:

1. In an engine starter drive a power shaft, a hollow shaft thereon having a smooth part and a threaded part, means connecting the hollow shaft for rotation with the power shaft, a pinion slidably journalled on the power shaft for movement into engagement with an engine gear, a nut on the hollow shaft, a yielding driving connection between the nut and pinion, a compression spring urging the nut into engagement with the threads of the hollow shaft, anti-drift means yieldingly resisting longitudinal movement of the nut to maintain demeshed clearance between the pinion and engine gear and means limiting the expansion of the spring to prevent its moving the nut against the anti-drift means.

2. In an engine starter drive a power shaft, a shaft fixed thereon having a screw-threaded portion and a smooth portion, a nut on the screw shaft, a pinion slidably journalled on the power shaft for movement into and out of engagement with a member of an engine to be started, a yielding driving connection from the nut to the pinion, detent means yieldingly holding the pinion demeshed from the engine gear, a spring urging the pinion into engagement with the screw threads, and means limiting the expansion of the spring to prevent its acting against the detent.

KENNETH F. DOUGLAS.